(12) United States Patent
Pizzato et al.

(10) Patent No.: US 12,024,923 B2
(45) Date of Patent: Jul. 2, 2024

(54) SAFETY HANDLE FOR THE CONTROL OF ACCESS FOR MACHINES OR INDUSTRIAL PLANTS

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 711 days.

(21) Appl. No.: 17/059,441

(22) PCT Filed: May 31, 2019

(86) PCT No.: PCT/IB2019/054543
§ 371 (c)(1),
(2) Date: Nov. 29, 2020

(87) PCT Pub. No.: WO2019/229717
PCT Pub. Date: Dec. 5, 2019

(65) Prior Publication Data
US 2021/0230904 A1   Jul. 29, 2021

(30) Foreign Application Priority Data
May 31, 2018 (IT) .......................... 102018000005914

(51) Int. Cl.
E05B 47/00 (2006.01)
E05B 1/00 (2006.01)
F16P 3/14 (2006.01)

(52) U.S. Cl.
CPC ............... *E05B 47/00* (2013.01); *E05B 1/00* (2013.01); *F16P 3/144* (2013.01); *E05B 2047/0057* (2013.01); *E05B 2047/0068* (2013.01)

(58) Field of Classification Search
CPC ...... F16P 3/08; F16P 3/12; F16P 3/144; E05B 1/00; E05B 47/00; E05B 2047/0057; E05B 2047/0068
(Continued)

(56) References Cited

U.S. PATENT DOCUMENTS

| 2007/0180869 | A1* | 8/2007 | Geyer | D06F 39/14 |
| | | | | 68/196 |
| 2015/0275551 | A1* | 10/2015 | Rink | H01H 27/007 |
| | | | | 70/263 |
| 2018/0315265 | A1* | 11/2018 | Zabala Zabaleta | ............... |
| | | | | G07C 9/00571 |

FOREIGN PATENT DOCUMENTS

| EP | 2112674 A2 * | 10/2009 | ........... H01H 27/002 |
| WO | WO-2017208126 A1 * | 12/2017 | ........... H01H 27/002 |

* cited by examiner

*Primary Examiner* — Kevin J Comber
(74) *Attorney, Agent, or Firm* — Rivka Friedman

(57) ABSTRACT

A safety handle for the control of access to machines or industrial plants comprises a main body (3, 4) adapted to be gripped by a user for moving the movable part (M) of the access (A), fixing means for fixing the main body (3, 4) to the movable part (M), an actuator (2) suitable to be associated with the main body (3, 4) to interact with control means associated with the access (A) upon closure thereof for enabling the machine or industrial plant to be controlled. The main body (3, 4) houses thereinside one or more signalling and/or control devices (25, 26) provided with electrical connection means for connection to one or more power and/or service circuits of the machine or industrial plant, at least one of the signalling and/or control devices comprising one or more light sources (25) adapted to emit a light beam.

8 Claims, 8 Drawing Sheets

(58) Field of Classification Search
USPC .......................................................... 361/139
See application file for complete search history.

SAFETY HANDLE FOR THE CONTROL OF ACCESS FOR MACHINES OR INDUSTRIAL PLANTS

TECHNICAL FIELD

The present invention finds application in the field of electrical devices for industrial use and particularly relates to a safety handle applicable to barriers or protection panels for monitoring the access to machines or industrial plants.

STATE OF THE ART

As known, access to machines or industrial plants requires constant surveillance through the provision of means that prevent voluntary or accidental entry into the operating perimeter by the operators.

To this end, the accesses such as barriers, perimeters and protection panels are generally provided with one or more safety devices connected to the power supply circuit of the machine or plant, as well as possibly to auxiliary service circuits, in order to allow access within the perimeter only after the machine or system or dangerous parts are blocked, constantly indicating both the operating status of the machine or plant and any anomalies that may affect any part of the plant.

The safety degree of these devices has to be as high as the higher the risk that would occur if an operator were to enter the perimeter with the machine or plant still operating.

A known type of access control devices are the safety handles, i.e. those devices allowing the opening and closing of the access, at the same time allowing the plant to be stopped, or only a part thereof, upon the opening of the access or the simple unlocking thereof.

An example of a safety handle is disclosed in US2005/108945, wherein the handle comprises magnetic-type sensor means which detect the access opening for operating the consequent opening of the power supply circuit and the consequent shutdown of the plant.

Another example of a security handle for controlling access is disclosed in DE102009039591, wherein the handle is associated with actuator means adapted to interact with an operating device associated with the fixed part of the access.

Generally, these handles comprise a main body formed by an anchoring bracket fixed to the frame of the movable part of the access and a shell or casing which can also have the function of a handle, fixed in turn to the bracket.

For example, in EP2264353, in the name of the same Applicant, the handle comprises an anchoring bracket fixed to the movable part of the access and on which a handle runs integral with a key actuator adapted to interact with switching means associated with the fixed part of the access.

The fixing of the handle of the main body to the movable part of the access is obtained by means of common fastening members, such as screws, pins, snap-in means, which can be inserted either frontally or posteriorly or laterally to the shell, also according to the shape of the handle.

Yet another example of such handles is disclosed in EP2112674, always in the name of the present Applicant.

A first drawback of these handles is represented by the fact that the fixing means to the movable part of the access are accessible once the handle is mounted on the door, making it possible to remove them and consequently disassemble the handle in unsafe conditions, as it could be possible to remove part of the handle, or the whole handle, and possibly access inside the safety perimeter without the plant stops and without having evidence that this non-compliant behaviour has occurred.

A further limitation of the known handles is the absence of customization possibilities. In particular, the known handles are designed so that the user cannot decide to apply certain control or signalling devices selected on the basis of their own needs, unless they require handles specifically and exclusively designed for that specific purpose.

For example, handles for industrial use are provided with operating buttons and signalling lights.

However, these handles have a very limited configurability and usually limited to purely aesthetic aspects, such as the colour of the light beam.

Furthermore, these handles do not allow the use of the same basic structure to apply different types of actuators.

Last but not least, these handles are not provided with actuators adapted to interact with machine or plant control means in order to send control signals and/or produce the locking/unlocking of the access together with the closing/opening of the moving part.

SCOPE OF THE INVENTION

The object of the present invention is to overcome the above drawbacks by providing a safety handle adapted to be applied to accesses for the control of industrial machines or plants which is characterized by high efficiency and relative cost-effectiveness.

A particular object is to provide a safety handle which is highly secure against possible attempts to disassemble it in the condition of closed access.

Still another object is to provide a safety handle which provides evidence of any tampering or disassembly attempts.

Still another object is to provide a safety handle which has a high degree of configurability, both from a functional and an aesthetic point of view, without it being necessary to modify its basic structure according to the operating or signalling device selected by the end user.

These objects, as well as others which will become more apparent hereinafter, are achieved by a safety handle which, according to claim 1, comprises a main body adapted to be anchored to the movable part of the access to be controlled and adapted to be gripped by a user for the movement of the movable part of the access, means for fixing said main body to the movable part of the access, an actuator suitable to be associated with said main body and adapted to interact with control means associated with the fixed part of the access upon closing thereof for enabling the machine or plant to be controlled.

The main body houses inside one or more signalling and/or control devices provided with means for the electrical connection to one or more power and/or service circuits of the machine or industrial plant.

In this way the handle, in addition to allowing the interaction between the actuator and the control means when the access is closed, allowing for example the sending of a signal adapted to enable the start-up of the machine or plant, will allow to send further commands or visible and/or audible signals useful for secure access control. Advantageous embodiments of the invention are obtained according to the dependent claims.

BRIEF DISCLOSURE OF THE DRAWINGS

Further features and advantages of the invention will become more apparent in the light of the detailed description of some preferred but not exclusive embodiments of a safety handle according to the invention, illustrated by way of non-limiting example with the aid of the accompanying drawings in which.

BEST MODES OF CARRYING OUT THE INVENTION

With reference to the attached figures, some preferred but not exclusive embodiments of a safety handle adapted to be applied to the access of a perimeter or safety barrier protecting a machine or industrial plant are shown.

In particular, the access may be suitably provided with appropriate electronic or electromechanical safety devices suitable for interrupting the operation of the machine or plant, or of a part thereof, when it is opened or even only unlocked, or to signal the release or opening in order to allow an operator to intervene, according to known methods and therefore not disclosed in more detail hereinafter.

Figure 1:
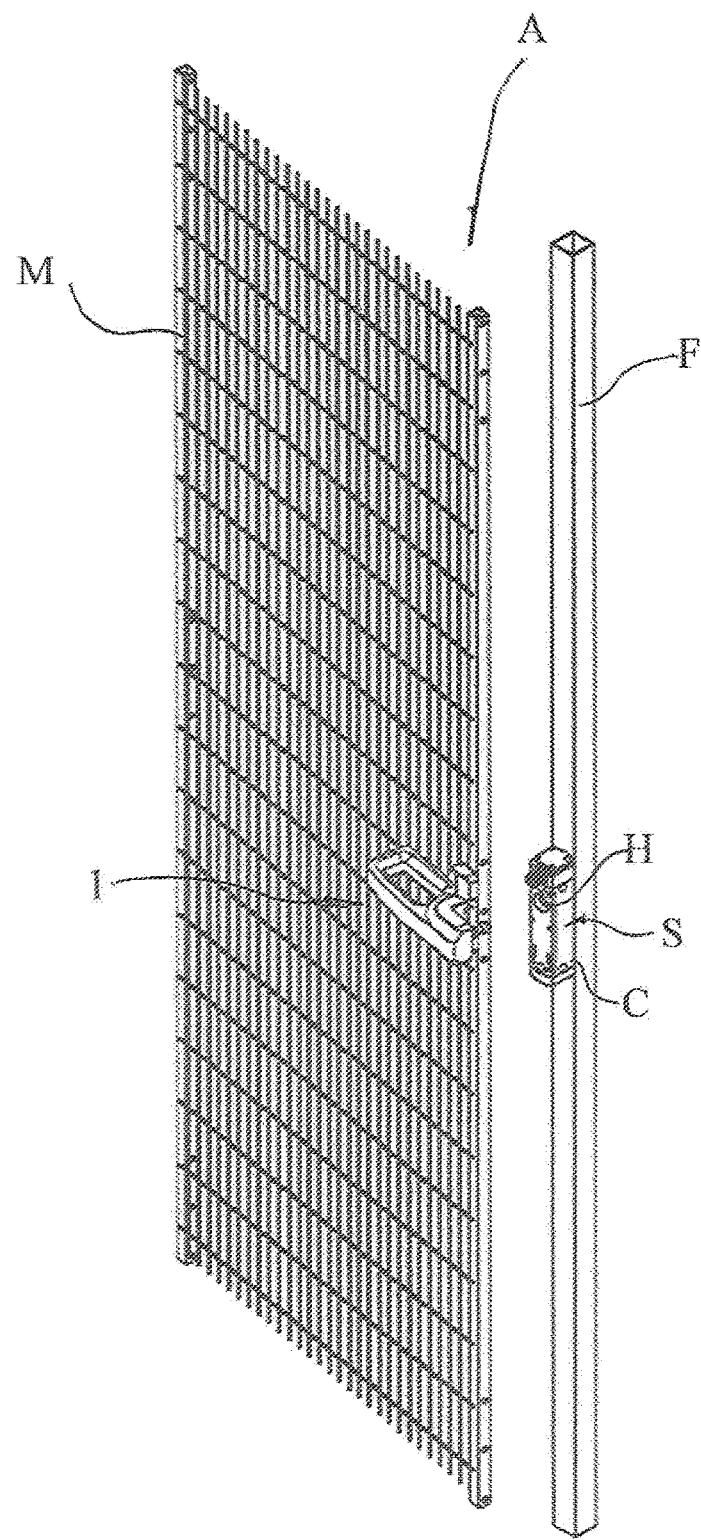
FIG. 1 is a perspective view of the handle in a first preferred embodiment applied to an access and wherein the access is open.
Figure 2:
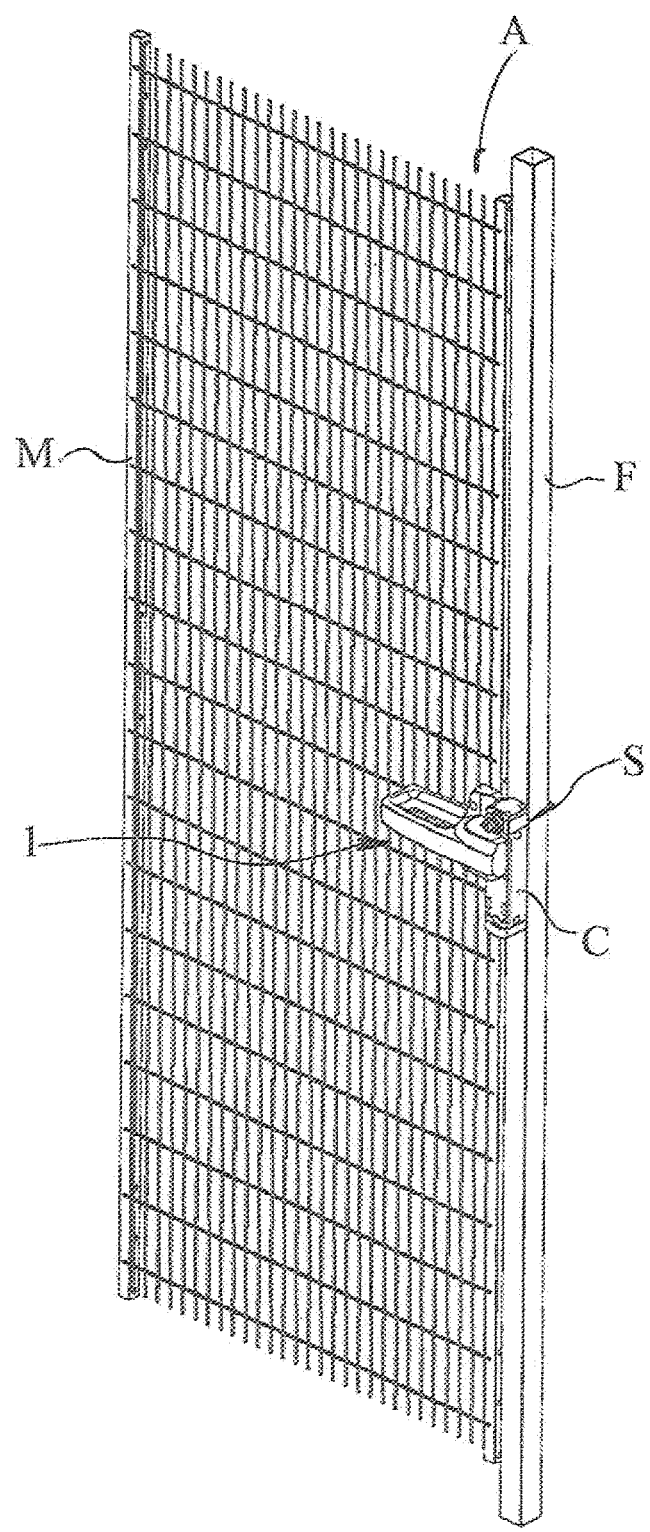
FIG. 2 is a perspective view of the handle of FIG. 1 applied to an access and wherein the access is closed.

As shown in FIGS. 1 and 2, the handle, globally indicated with 1, will be designed to be anchored to a movable part M of the access A to be controlled so that when the access is closed, an actuator 2 interacts with a switch S associated with the fixed part F of the access A and provided with switching means, not visible since they are inside the switch S, connected to the power and service circuits of the machine or plant for opening/closing them after opening/closing or locking/unlocking of access A, according to modalities also known herein and therefore not disclosed in more detail.

In its more general configuration, the handle 1 comprises a main body adapted to be anchored to the movable part M of the access A to be controlled and adapted to be gripped by a user for moving the movable part M, to which it is fixed by fixing means.

The main body is also associated, in a fixed or removable manner, to an actuator 2 adapted to interact with control means associated with the fixed part F of the access A upon the closure thereof for enabling the machine or plant to be controlled. According to a first embodiment, more clearly visible in FIG. 3, the main body is composed of two distinct elements, i.e, a bracket 3 for anchoring to the movable part M of the access A to be controlled and a shell 4.

The latter in the specific shown embodiment also has the function of a handle to be grasped by the user and allow the movement of the movable part M.

However, according to not shown variants, a handle may be provided distinct from the shell 4, connected in a fixed or removable manner to the shell itself 4 or to the bracket 3.

In this particular embodiment the shell 4 is connected to the bracket 3 by anchoring means which comprise a plurality of connecting members, generally designated by 5, inserted in corresponding pairs of mutually aligned holes 6, 7 realized respectively in the bracket 3 and in the shell 4.

At least one hole of each pair will be of a through type to allow the insertion of the respective connecting member 5.

In particular, in the illustrated but not limitative embodiment, there are two pairs of front holes 6, 7; 6', 7' axially aligned with each other for the front insertion of two connecting screws 5, 5' and a pair of side holes 6", 7" axially aligned for lateral insertion of a further connecting screw 5".

At least the holes 7, 7', 7" made in the shell 4 are through holes, while the holes 6, 6', 6" made in the bracket 3 may be either blind or through, without particular limitations.

The main body will have a plurality of passages 8, 8', 8" for the insertion of means for its fixing to the movable part M of the access A, not shown in the figures, which may be screws, pins or similar members.

Advantageously, the passages 8, 8', 8" may be elongated slots to allow adjustment of the position of the main body during its assembly on the movable part M of the access A.

In the illustrated, non-limiting embodiment, the passages 8, 8', 8" are made in the bracket 3.

The number and shape of the fixing passages 8, 8', 8" (three in the illustrated embodiment) may vary according to the shape of the bracket and do not represent a limiting aspect for the present invention.

In the illustrated embodiments the shell 4 is shaped to completely cover the bracket 3, with the exception of the rear part facing the inside of the safety perimeter, and consequently also the passages 8, 8', 8" are protected by the shell 4.

However, according to not shown variants, the shell 4 may leave part of the bracket 3 free and possibly also one or more of the fixing passages 8, 8', 8". The bracket 3 is also provided with an actuator 2 adapted to interact with the switch S mounted on the fixed part F of the access A to be controlled.

However, according to not shown variants, the actuator 2 may be mounted on the shell 4 or directly on the movable part M of the access A.

In the shown embodiment, the actuator 2 is of the remote-actuated type, that is equipped with an RFID (Radio Frequency Identification) tag designed to communicate with an antenna placed in the fixed switch S to signal the closure of access A.

Advantageously, the RFID tag will be coded so that it can be uniquely recognized by the switch S and prevent the use of actuators different from that connected to the handle 1, avoiding the risk of unsafe opening of the access A.

In this first embodiment, the actuator 2 comprises a containment body 9 which incorporates the tag and is also provided with a centering element 10 which can be inserted in a hole H provided in the casing C of the switch S and which may also have a function of holding the handle 1 on the switch S by interacting with a locking device located in the switch casing according to known methods and disclosed for example in WO2015083143, in the name of the same Applicant.

However, it is understood that the actuator 2 may also be of another type, for example with an electromechanical action, such as a key actuator, or by means of magnetic or electromagnetic, optical or other types of sensors.

According to a peculiar feature of the invention, sealing means are provided for covering the means for fixing the main body to the movable part M of the access A, so as to prevent access to these fixing means.

In the shown embodiment, the sealing means will then cover the fixing means of the bracket 3, i.e. the passages 8, 8', 8" and the relative fixing members inserted therein. The sealing means may protect the fixing means directly or indirectly by their application on the anchoring means, in the case in which the shell 4 completely covers the bracket 3.

In the configurations of the figures, the anchoring means comprise, for each of the connecting members 5, an antitampering plug 11, 11', 11" adapted to close the through hole 7, 7', 7" of the corresponding pair of holes at its open end facing outwards and preventing access from the outside to the connecting member 5, 5', 5", which may be a screw, a pin or a similar member.

In this way it will not be possible to remove the shell 4 from the bracket 3 without leaving a trace of such an action and therefore it will not be possible to access the fixing means of the bracket 3 without leaving any trace of it.

According to not shown variants, the shell 4 will leave the fixing passages 8, 8', 8" uncovered and in this case the antitampering plugs 11, 11', 11" will be applied directly on the fixing members inserted in the fixing passages 8, 8', 8", either directly or through additional protection elements.

Preferably, the antitampering plugs may be snugly fitted in the corresponding through holes 7, 7', 7" made in the shell 4 so as not to present any element that may facilitate their extraction.

Moreover, the antitampering plugs 11, 11', 11" may be designed to break if they should be removed, in order to prevent them from being reinserted and immediately give evidence of the attempt of removal.

The antitampering plugs 11, 11', 11" may be internally hollow to also insert connecting members 5, 5', 5" with a non-flat head 12, 12', 12" and larger than the figures.

Thanks to this combination of features, the handle 1 will always be adequately protected against possible actions aimed at disassembling the shell 4 from the bracket 3, or the main body or its parts according to its specific configuration, and which could lead to access A in an unsafe condition.

Indeed, the presence of the sealing means, in addition to making disassembly more difficult, would provide the evidence as it would no longer be possible to restore the initial condition of the handle 1.

According to not shown variants, the connecting members 5, 5', 5" or the means for fixing the main body to the movable part M of the access A may not be associated with sealing means.

Figure 8:
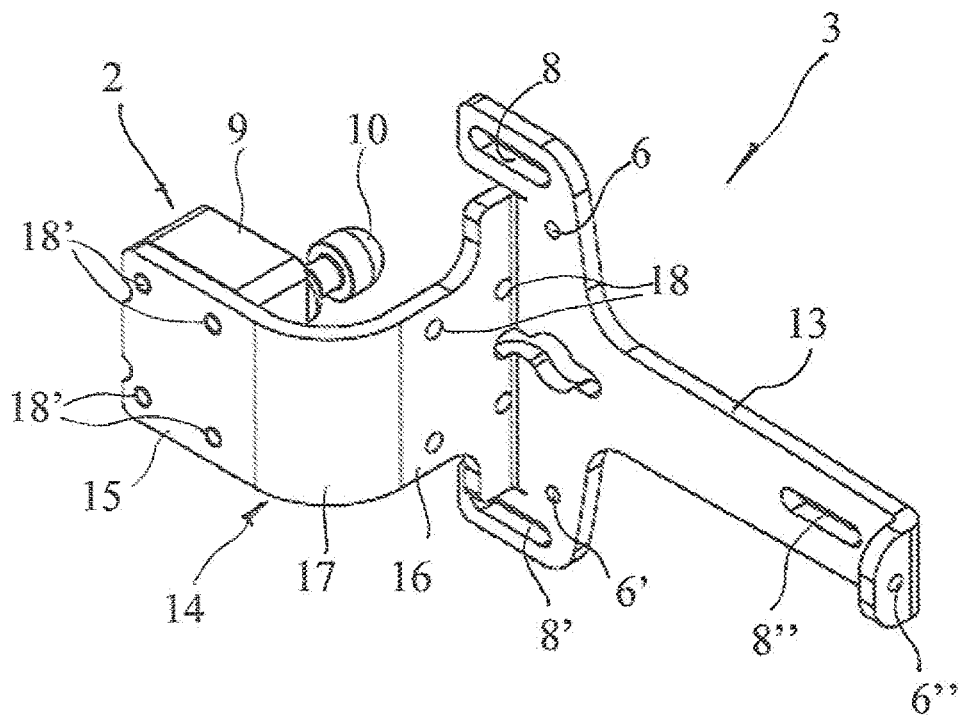
FIG. 8 is a perspective view of a detail of the handle of FIG. 3 in a first assembly way.
Figure 9:
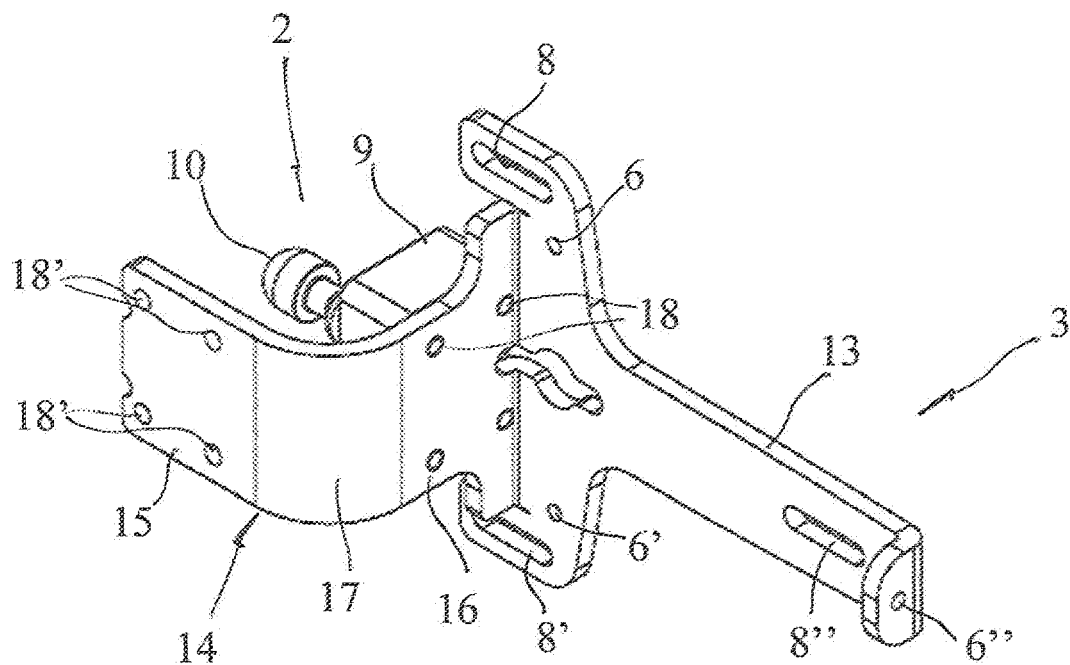
FIG. 9 is a perspective view of the detail of FIG. 8 in a second assembly way.

As shown in FIGS. 8 and 9, the bracket 3 comprises a flat plate 13 for its fixing to the access A and for anchoring the shell 4.

The flat plate 13 is integral with a curved shaped plate 14 which will have the purpose of allowing the anchorage of the actuator 2.

Advantageously, the shaped plate 14 comprises two flat portions 15, 16 mutually orthogonal and connected by an intermediate curved portion 17 or in any case angled.

Each of the two flat portions 15, 16 comprises a respective series of holes 18, 18' (four for each series in the illustrated configuration) for fixing the actuator 2 in two different positions mutually rotated of 90° by corresponding screw connection members 19 or the like, as visible from the comparison of the same FIGS. 8 and 9. According to not shown variants, the actuator 2 may be realized by snap-coupling, interference or other types of means, without particular theoretical limitations.

Figure 5:
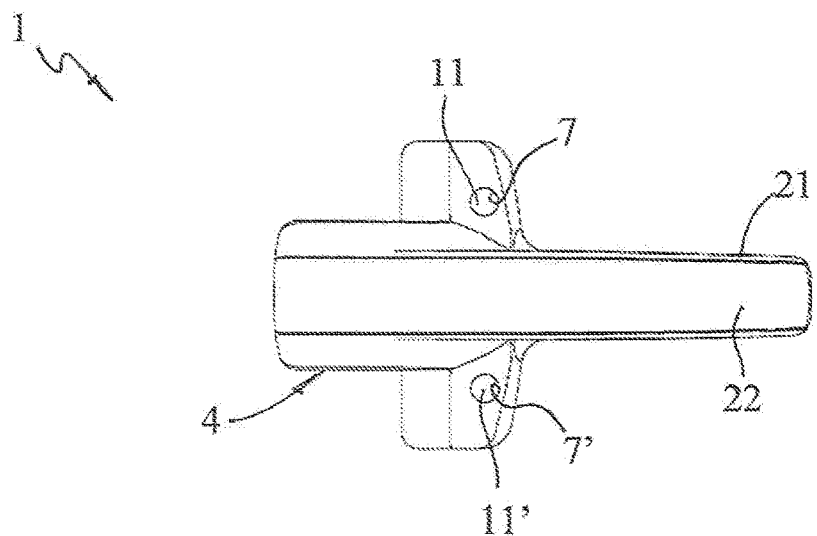
FIG. 5 is a front view of the handle of FIG. 3.
Figure 6:
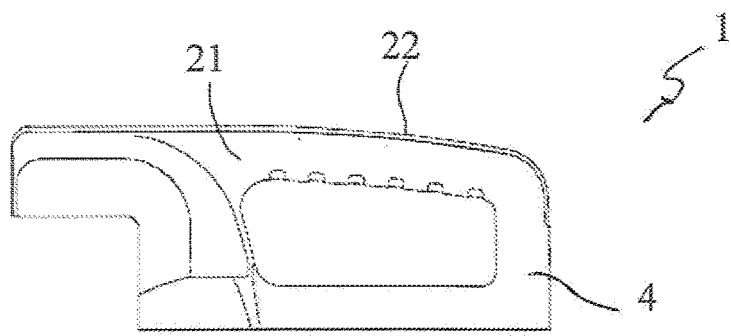
FIG. 6 is a top view of the handle of FIG. 3.
Figure 7:
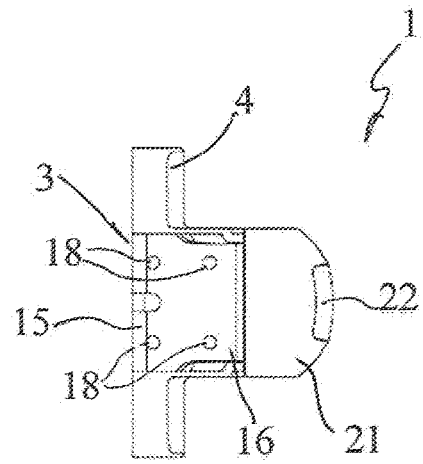
FIG. 7 is a side view of the handle of FIG. 3.

In this way the handle 1 provided with the actuator 2 may be used both for swinging and sliding opening accesses, both of the right and of the left type, since the whole handle 1 will be substantially symmetrical with respect to a horizontal median plane, such as visible from FIGS. 5 to 7.

According to a particularly advantageous, but not exclusive variant, also the connecting members 19 of the actuator 2 to the bracket 3 may be associated with corresponding antitampering plugs 20, in a manner similar to that described above, so as to prevent the actuator 2 from being separated from the handle 1 and used in combination with switch S to cause the system to start in an unsafe condition of open access.

The shell 4 will usually consist of a plastic body of adequate strength which may be either full or hollow, depending on the requirements.

According to a particularly advantageous feature, the main body 3, 4 may house inside it or in any case be associated with one or more auxiliary command and/or signalling devices for the operation of the plant which may be connected to a circuit of the machine or plant through the provision of suitable electrical and/or electronic connection means.

Figure 3:
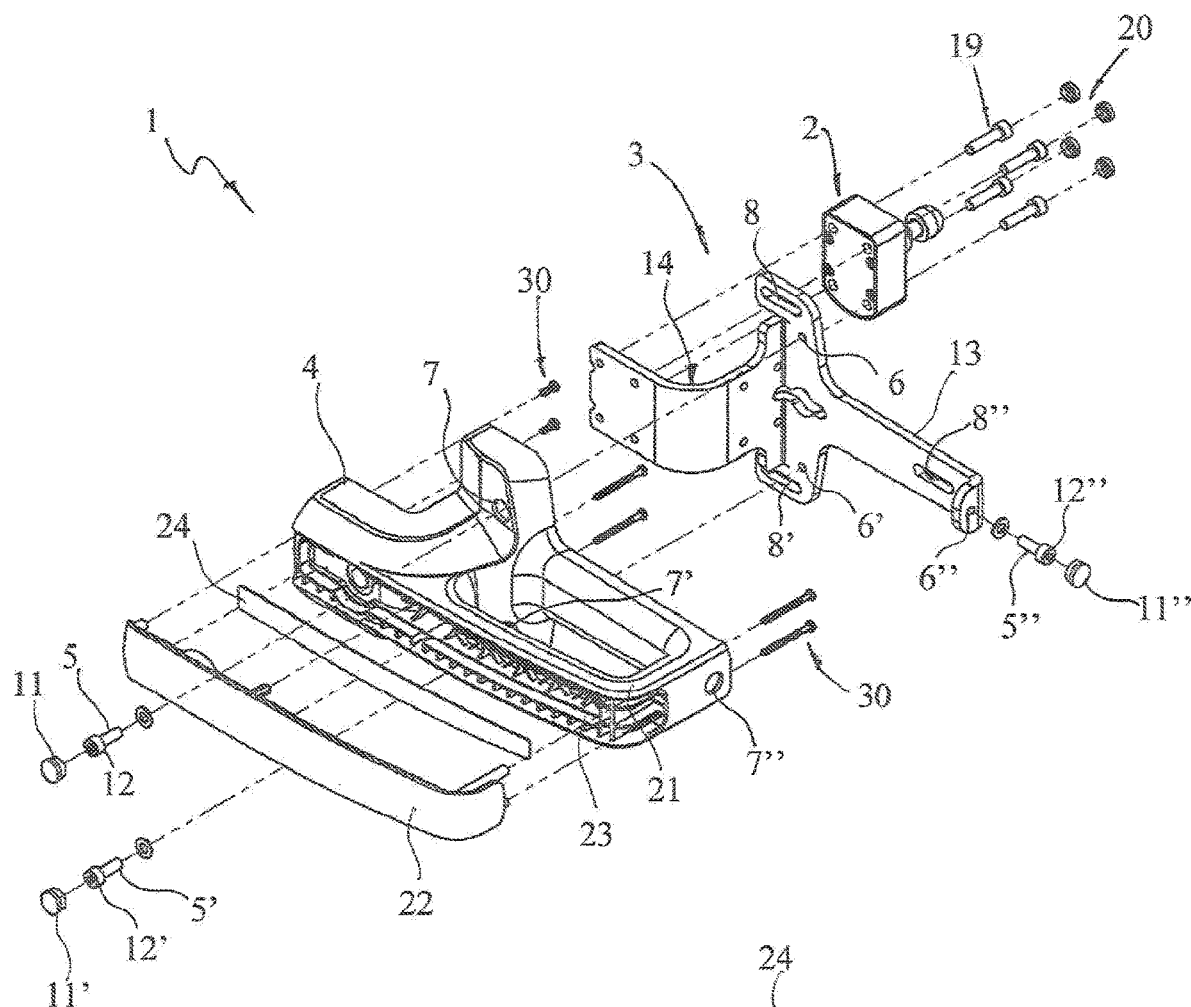
FIG. 3 is a perspective exploded view of the handle in a second preferred embodiment.

By way of example, in the variant shown in FIG. 3 it can be seen that the shell 4 comprises a front gripping element 21 having a front mask 22, which may be fixed or removable.

The mask 22 may be used to customize the handle 1 according to the needs of the user, for example by writing specific letters or symbols or by varying the colour.

The mask 22 may be anchored to the front griping element 21 in a removable or fixed manner.

In a particular variant, the gripping element 21 will be internally hollow to define an inner housing 23 which may possibly be made accessible by removing the mask 22 in the event that the latter is removable.

Inside the housing 23 it will be possible to insert the above control and/or signalling devices auxiliary to the operation of the plant and which may be connected to a circuit of the machine or plant by means of electrical and/or electronic connection means located inside the housing 23, such as for example a PCB (printed circuit board) 24.

Figure 4:
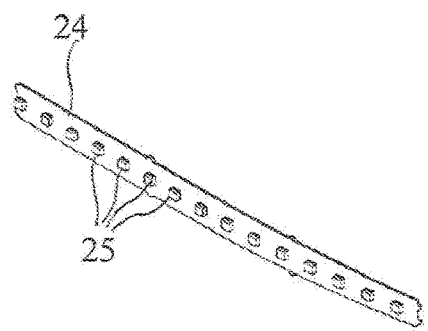
FIG. 4 is a perspective view of a detail of the handle of FIG. 3 according to a peculiar variant.

According to a particular variant, it will be possible to insert one or more light sources, such as one or more LED lights 25, for example placed directly on the PCB 24 as in FIG. 4, which can be lit according to different modes depending on the state of the machine or plant, so as to give immediate evidence of it.

In particular, the signalling device 25 may emit a light beam having variable coloration and/or switching on/off frequency according to the operating status of the access A to be controlled.

For this purpose, the mask 22 will be at least partially optically transparent or translucent to allow the passage of the light beam produced by the light sources 25. However, it is understood that the position of the LED lights 25 on the gripping element 21 is by way of example only, since in general the control and/or signalling devices, including the LED lights 25, may be applied to any part of the main body 3, 4.

Figure 10:
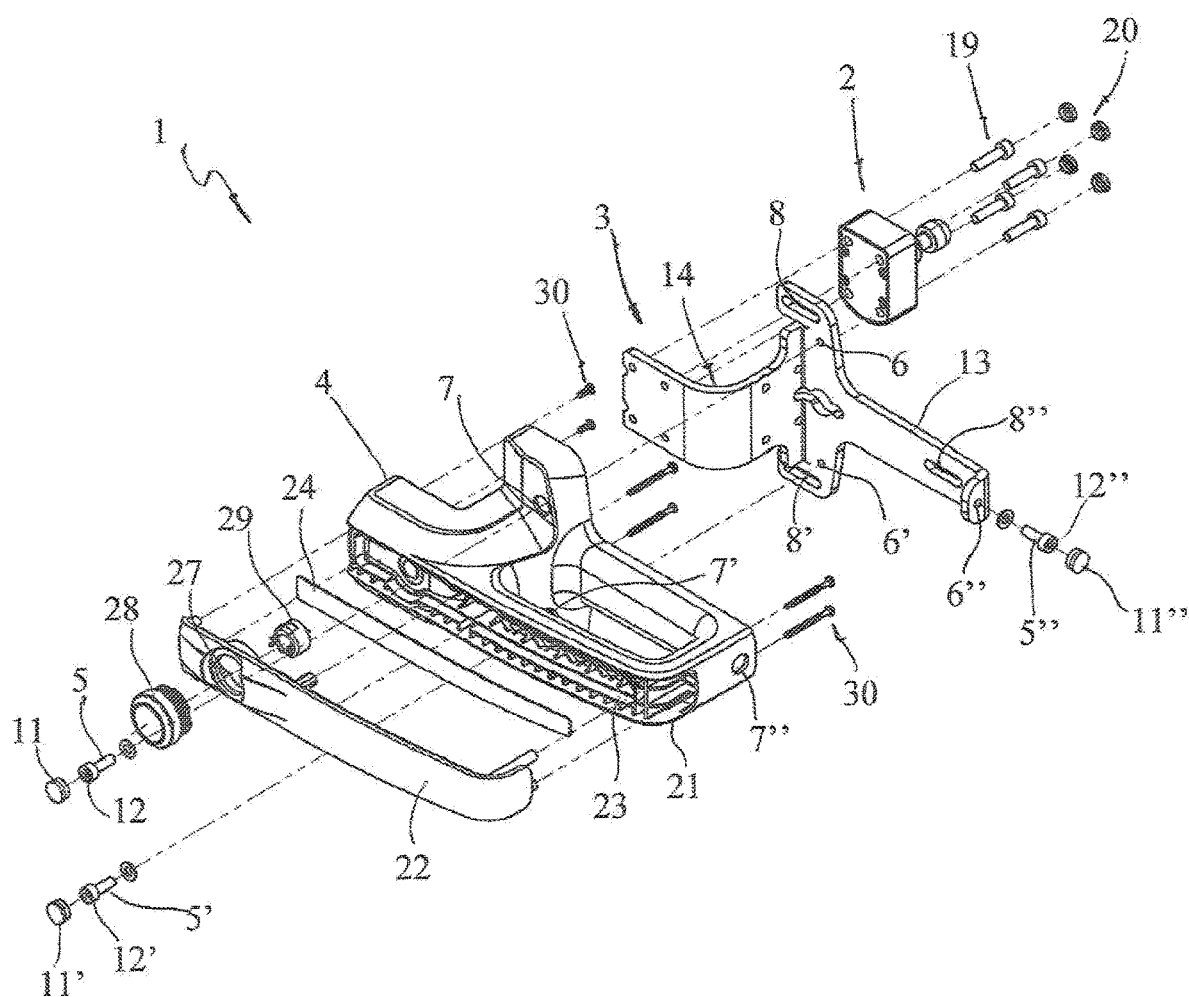
FIG. 10 is a perspective exploded view of the handle in a third preferred embodiment.
Figure 11:
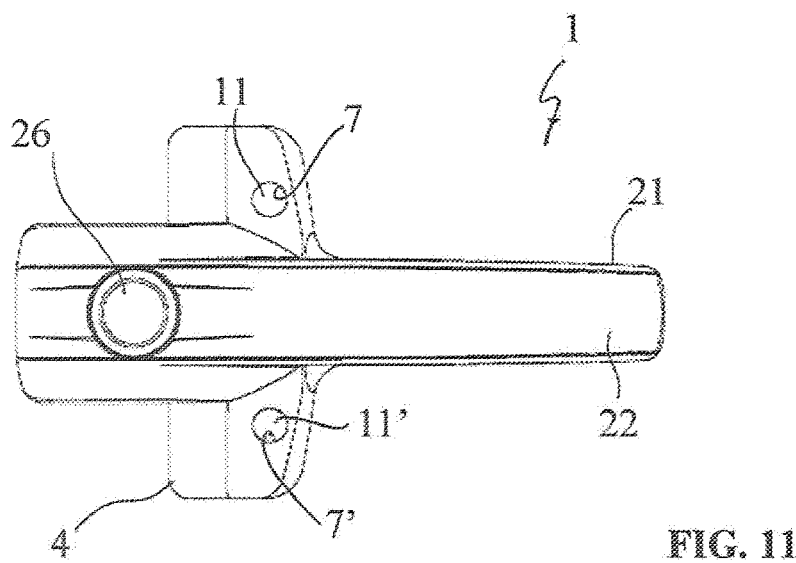
FIG. 11 is a front view of the handle of FIG. 10.
Figure 12:
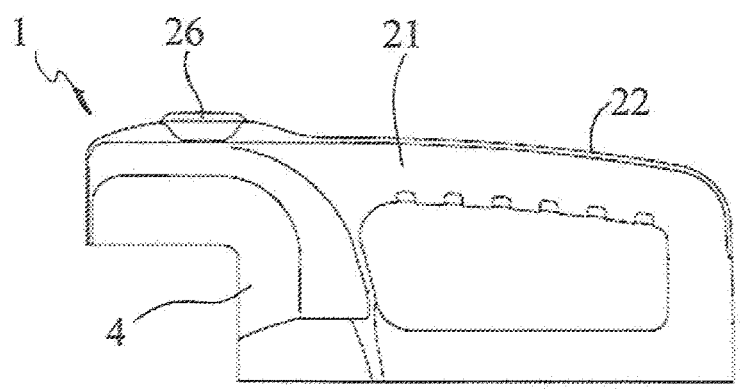
FIG. 12 is a top view of the handle of FIG. 10.
Figure 13:
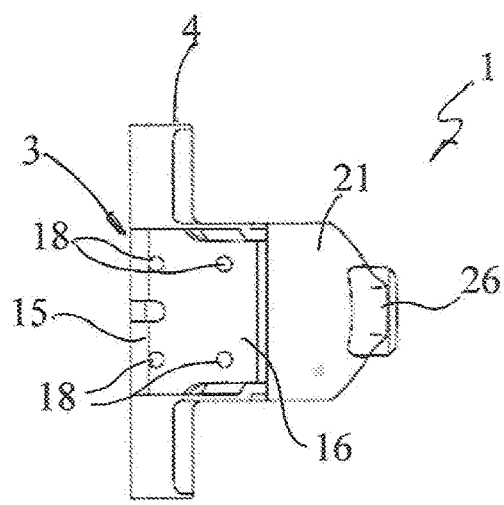
FIG. 13 is a side view of the handle of FIG. 10.

According to yet another variant, shown in FIG. 10, the handle 1 will be provided with a control or signalling device 26 adapted to be connected to a power supply and/or service circuit of the machine or plant to be controlled.

The control or signalling device 26 may be an operating button, as shown in the figure, a selector, a display, a touch panel or any other electrical, electronic, electromechanical device suitable for giving a command or for sending a signal to one or more power and/or service circuits of the machine or plant.

According to a particular variant, not shown, the handle 1 may be provided with an antenna adapted to dialogue and recognize an RFID tag with univocal coding housed in an identification device, such as a badge, an electronic key or similar, belonging to an operator enabled to operate on the machine or plant, so that the opening of access A will be enabled only following recognition of the tag by the antenna.

Other control or signalling devices may be selected among biometric devices, such as devices for the recognition of fingerprints, face recognition or other types of recognition, without particular limitations.

In this way, through this device 26 it will be possible to send an electric command to the machine or plant, such as a signal to request the opening or unlocking of access A, an interruption of the machine or plant or further service signals.

In particular, the mask 22 comprises one or more seats 27 for housing an actuator 28 belonging to respective control or signalling devices 26 adapted to interact with a contact unit 29 located inside the housing 23 and connected to the PCB 24, according to methods that depend on the type of command.

The fastening of the mask 22 to the shell 4 may be achieved by means of connection means 30 of the screw or similar type, or by snap or interference, without particular theoretical limitations.

According to a not shown variant, the handle 1 may be provided both with one or more signalling and/or control devices 26 and with the light sources 25, for example associated with the PCB 24.

Figure 14:
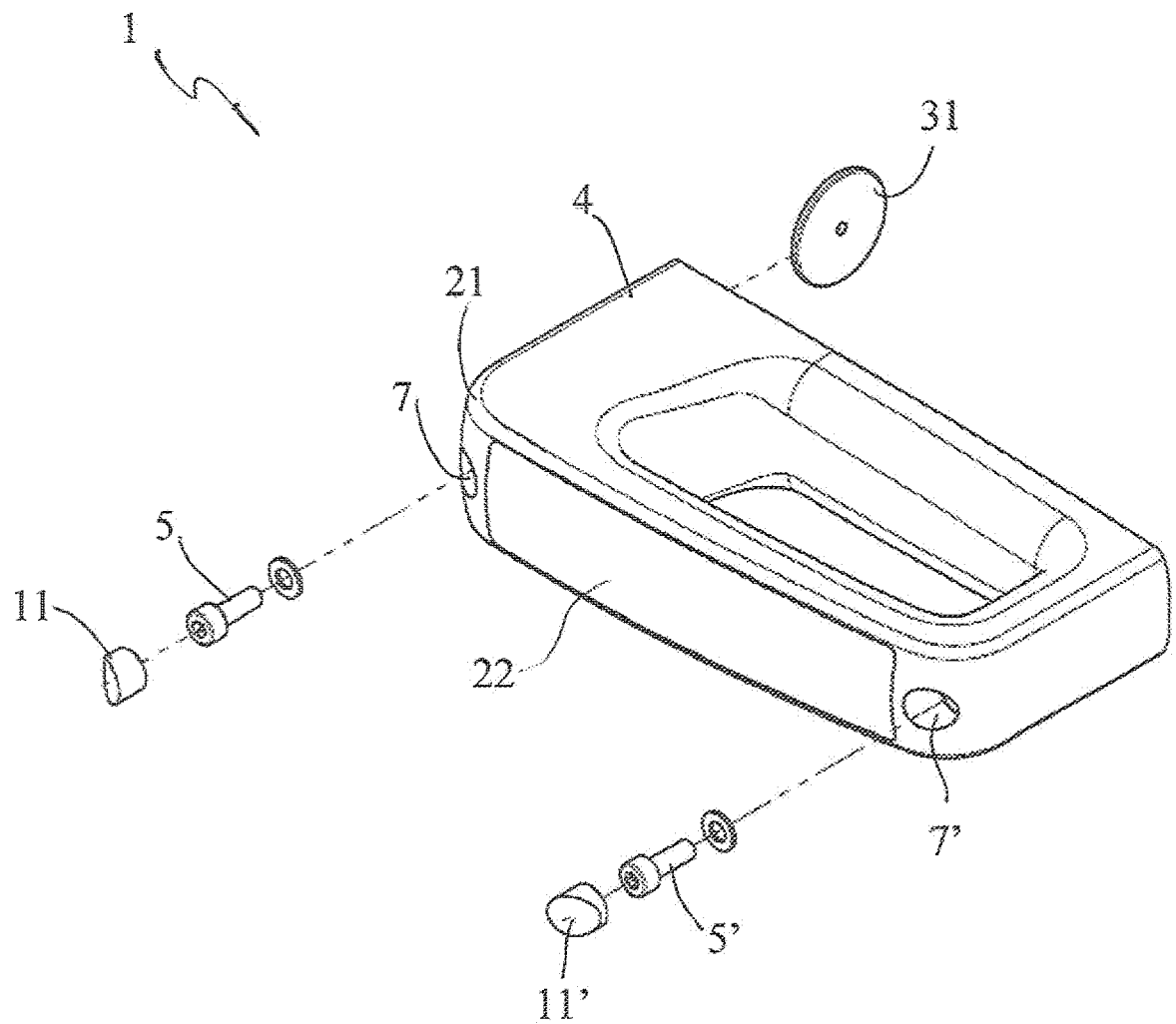
FIG. 14 is a perspective exploded view of the handle in a fourth preferred embodiment.

FIG. 14 shows a further embodiment of the handle 1, which differs from the preceding ones, first of all due to the more linear shape of the main body. This shape is made possible since the actuator 2 comprises an RFID tag 31 housed inside the main body and without a centering and locking element.

The methods of connecting the tag 31 to the main body of the handle 1 are not limiting and are not described in more detail. By way of example only, the tag 31 may be interlocked in a suitable seat, not shown, made inside the bracket 3 or the shell 4.

The tag 31 will interact with corresponding sensor means located on the fixed part F of the access A in place of the aforementioned switch S, so as to send a presence signal which will be processed by suitable machine or plant control means according to known methods disclosed for example in WO2013098788.

In this embodiment the main body will be constituted by the shell 4 only having the function of a handle in the absence of the bracket 3 or by a shell 4 having the gripping function which frontally covers the entire bracket 3.

In the first case the connecting members 5, 5' will also function as fixing means and will be protected by the two antitampering plugs 11, 11' acting as sealing means snugly fitted in the through holes 7, 7' of the shell 4.

In the second case, the connecting members 5, 5' will have function only of means for anchoring the shell 4 to the bracket 3, which will be fixed to the movable part M of the access A similarly to the above disclosure.

The handle according to the invention is susceptible of numerous modifications and variations, all of which are within the scope of the inventive concept expressed in the appended claims. All the details may be replaced by other technically equivalent elements, and the materials may be different according to requirements, without departing from the scope of protection of the present invention.

The invention claimed is:

1. A safety handle for the control of access to machines or industrial plants, comprising:
   a main body adapted to be anchored to a movable part of an access to be controlled and provided with a gripping element adapted to be gripped by a user for moving the movable part of the access and with a plurality of passages;
   fixing means adapted to be inserted in said passages for fixing said main body to the movable part of the access;
   an actuator suitable to be associated with said main body and adapted to interact with control means associated with a fixed part of the access upon closure thereof for enabling the machines or industrial plants to be controlled;
   wherein said main body houses there inside one or more signaling and/or control devices provided with electrical connection means for connection to one or more power and/or service circuits of the machine or industrial plant, at least one of said signaling and/or control devices comprising one or more light sources adapted to emit a light beam,
   wherein said main body comprises a bracket for anchoring to the movable part of the access provided with said passages and a shell adapted to at least partially cover said bracket and anchored to said bracket,
   wherein anchoring means are provided for anchoring said bracket to said shell, and
   wherein said shell covers said bracket at least at said passages.

2. The handle as claimed in claim 1, wherein at least one of said signaling and/or control devices is a control device adapted to be connected to a power or service circuit of the machines or industrial plants to be controlled to send an electrical signal to the machines or industrial plants.

3. The handle as claimed in claim 2, wherein said control device is selected from the group consisting of: buttons, selectors, touch displays, touch panels, RFID tag, and biometric sensors.

4. The handle as claimed in claim 1, wherein said one or more light sources are adapted to emit respective light beams having switching on/off frequency and/or colour variable according to an operating state of the access to be controlled.

5. The handle as claimed in claim 4, wherein said main body comprises a frontal mask at least partially optically transparent or translucent to allow the passage of the light beam produced by said one or more light sources.

6. The handle as claimed in claim 5, wherein said main body comprises one or more internal housings for corresponding control and/or signaling devices.

7. The handle as claimed in claim 1, further comprising sealing means provided for covering said fixing means and preventing access from outside.

8. The handle as claimed in claim 1, wherein said anchoring means comprise a plurality of connecting members inserted into corresponding pairs of mutually aligned holes made respectively in said bracket and in said shell and having at least one through hole to allow insertion of a respective connecting member.

\* \* \* \* \*